United States Patent
Wolk et al.

(10) Patent No.: US 12,248,118 B2
(45) Date of Patent: *Mar. 11, 2025

(54) OPTICAL METASURFACE FILMS

(71) Applicants: 3M INNOVATIVE PROPERTIES COMPANY, St. Paul, MN (US); PRESIDENT AND FELLOWS OF HARVARD COLLEGE, A CHARITABLE CORPORATION OF MASSACHUSETTS, Cambridge, MA (US)

(72) Inventors: Martin B. Wolk, Woodbury, MN (US); Robert L. Brott, Woodbury, MN (US); Karl K. Stensvad, Eagan, MN (US); James M. Nelson, Lino Lakes, MN (US); Federico Capasso, Cambridge, MA (US); Xinghui Yin, Cambridge, MA (US); Joon-Suh Park, Cambridge, MA (US)

(73) Assignees: 3M Innovative Properties Company, St. Paul, MN (US); President and Fellows of Harvard College, Cambridge, MA (US)

( * ) Notice: Subject to any disclaimer, the term of this patent is extended or adjusted under 35 U.S.C. 154(b) by 343 days.

This patent is subject to a terminal disclaimer.

(21) Appl. No.: 17/777,211

(22) PCT Filed: Dec. 1, 2020

(86) PCT No.: PCT/IB2020/061332
§ 371 (c)(1),
(2) Date: May 16, 2022

(87) PCT Pub. No.: WO2021/111300
PCT Pub. Date: Jun. 10, 2021

(65) Prior Publication Data
US 2022/0404525 A1 Dec. 22, 2022

Related U.S. Application Data

(60) Provisional application No. 62/942,386, filed on Dec. 2, 2019.

(51) Int. Cl.
G02B 1/00 (2006.01)
G02B 26/06 (2006.01)

(52) U.S. Cl.
CPC ............ G02B 1/002 (2013.01); G02B 26/06 (2013.01); G02B 2207/101 (2013.01)

(58) Field of Classification Search
CPC ... G02B 1/002; G02B 26/06; G02B 2207/101
(Continued)

(56) References Cited

U.S. PATENT DOCUMENTS

| 4,374,077 A | 2/1983 | Kerfeld |
| 4,576,850 A | 3/1986 | Martens |

(Continued)

FOREIGN PATENT DOCUMENTS

| CN | 108490509 A | 9/2018 |
| CN | 110501772 A | 11/2019 |

(Continued)

OTHER PUBLICATIONS

Devlin, "Broadband High-Efficiency Dielectric Metasurfaces for the Visible Spectrum", Proceedings of the National Academy of Sciences, Sep. 2016, vol. 113, No. 38, pp. 10473-10478.

(Continued)

*Primary Examiner* — William Choi (57) ABSTRACT

An optical metasurface film includes a flexible polymeric film having a first major surface, a patterned polymer layer having a first surface proximate to the first major surface of the flexible polymeric film and having a second nanostructured surface opposite the first surface, and a refractive index contrast layer adjacent to the nanostructured surface of the (Continued)

patterned polymer layer forming a nanostructured bilayer with a nanostructured interface. The nanostructured bilayer acts locally on amplitude, phase, or polarization of light, or a combination thereof and imparts a light phase shift that varies as a function of position of the nano structured bilayer on the flexible polymeric film. The light phase shift of the nanostructured bilayer defines a predetermined operative phase profile of the optical metasurface film.

20 Claims, 8 Drawing Sheets

(58) Field of Classification Search
USPC ......................................................... 359/642
See application file for complete search history.

(56) References Cited

U.S. PATENT DOCUMENTS

| | | | |
|---|---|---|---|
| 4,847,137 | A | 7/1989 | Kellen et al. |
| 5,175,030 | A | 12/1992 | Lu et al. |
| 5,691,846 | A | 11/1997 | Benson, Jr. et al. |
| 5,811,183 | A | 9/1998 | Shaw et al. |
| 6,045,864 | A | 4/2000 | Lyons et al. |
| 6,719,915 | B2 | 4/2004 | Willson et al. |
| 7,074,463 | B2 | 7/2006 | Jones et al. |
| 7,173,778 | B2 | 2/2007 | Jing et al. |
| 7,718,264 | B2 | 5/2010 | Klun et al. |
| 7,858,528 | B2 | 12/2010 | Sreenivasan |
| 7,947,608 | B2 | 5/2011 | Sreenivasan |
| 7,981,986 | B2 | 7/2011 | Hunt et al. |
| 8,034,452 | B2 | 10/2011 | Padiyath et al. |
| 8,263,129 | B2 | 9/2012 | Desimone et al. |
| 8,658,248 | B2 | 2/2014 | Anderson et al. |
| 8,703,232 | B2 | 4/2014 | Stay et al. |
| 8,720,052 | B2 | 5/2014 | Theis et al. |
| 8,808,811 | B2 | 8/2014 | Kolb et al. |
| 8,986,812 | B2 | 3/2015 | Hunt et al. |
| 9,302,291 | B2 | 4/2016 | Lyons et al. |
| 9,610,754 | B2 | 4/2017 | Cheah et al. |
| 9,718,961 | B2 | 8/2017 | Corveleyn et al. |
| 9,790,396 | B2 | 10/2017 | Klun et al. |
| 9,910,192 | B2 | 3/2018 | Hao et al. |
| 10,209,420 | B2 * | 2/2019 | Takeda ................... G02B 1/14 |
| 10,698,147 | B2 | 6/2020 | Takeda |
| 10,747,045 | B2 | 8/2020 | Oh et al. |
| 2005/0243447 | A1 | 11/2005 | Lee et al. |
| 2006/0105267 | A1 | 5/2006 | Khojasteh et al. |
| 2007/0298176 | A1 | 12/2007 | DiPietro et al. |
| 2009/0015757 | A1 | 1/2009 | Potts et al. |
| 2010/0178620 | A1 | 7/2010 | Dei et al. |
| 2013/0211310 | A1 | 8/2013 | Bommarito et al. |
| 2014/0314374 | A1 | 10/2014 | Fattal et al. |
| 2015/0062500 | A1 | 3/2015 | Park et al. |
| 2015/0214405 | A1 | 7/2015 | Nachtigal et al. |
| 2016/0211425 | A1 | 7/2016 | Tsujimoto et al. |
| 2017/0293371 | A1 | 10/2017 | Yao et al. |
| 2018/0224574 | A1 | 8/2018 | Lee et al. |
| 2018/0246262 | A1 | 8/2018 | Zhan et al. |
| 2018/0252857 | A1 | 9/2018 | Glik et al. |
| 2019/0064532 | A1 | 2/2019 | Riley, Jr. et al. |
| 2023/0184996 | A1 * | 6/2023 | Wolk ...................... G02B 1/04 359/485.03 |

FOREIGN PATENT DOCUMENTS

| | | |
|---|---|---|
| JP | 2005004068 A | 1/2005 |
| JP | 2016212156 A | 12/2016 |
| JP | 2019082643 A | 5/2019 |
| WO | 2008083304 A2 | 7/2008 |
| WO | 2008124180 A1 | 10/2008 |
| WO | 2017091738 A1 | 6/2017 |
| WO | 2017176921 A1 | 10/2017 |
| WO | 2018080830 A1 | 5/2018 |
| WO | 2019032635 A1 | 2/2019 |
| WO | 2020095258 A1 | 5/2020 |

OTHER PUBLICATIONS

EE, "Tunable Metasurface and Flat Optical Zoom Lens on a Stretchable Substrate", Nano Letters, 2016, vol. 16, No. 4, pp. 2818-2823.

International Search Report for PCT International Application No. PCT/IB2020/061332, mailed on Mar. 2, 2021, 3 pages.

International Search Report for PCT International Application No. PCT/US2019/060252, mailed on Apr. 9, 2020, 3 pages.

She, "Adaptive Metalenses with Simultaneous Electrical Control of Focal Length, Astigmatism, and Shift", Science Advances, Feb. 2018, vol. 04, No. 2, 7 pages.

Zhang et al., "Flexible, all-dielectric metasurface fabricated via nanosphere lithography and its applications in sensing." Optics Express, vol. 25, No. 18, Sep. 2017.

* cited by examiner

OPTICAL METASURFACE FILMS

CROSS REFERENCE TO RELATED APPLICATIONS

This application is a national stage filing under 35 U.S.C. 371 of PCT/IB2020/061332, filed Dec. 1, 2020, which claims the benefit of U.S. Provisional Application No. 62/942,386 filed Dec. 2, 2019, the disclosures of which are incorporated by reference in their entireties herein.

BACKGROUND

Metamaterials are synthetic composite materials having nano-scale features on at least one surface. When the nano-scale features are selected to have at least one dimension less than the wavelength of light impinging on the surface, the metamaterials may exhibit properties not readily obtainable using conventional materials and techniques. Metamaterials may have simple surface structures such as a single or small number of patterned layers or more complex surface structures such as stacked patterned layers, often in registration to each other, such that the individual nano-scale features interact electromagnetically with impinging radiation according to their design. Metamaterials with a single or small number of patterned layers are called metasurfaces. Metasurfaces having nano-scale surface features have recently found applications in optics, bio-sensing, semiconductors and other electronic devices.

Metasurfaces have been formed on rigid surfaces using e-beam lithography and atomic layer deposition, for example. These materials have been formed on substrates having a limited surface area. These materials have been formed on wafer substrates having a diameter of 300 mm or less.

There are two main types of metasurfaces: geometric phase metasurfaces and propagation phase metasurfaces. Geometric phase metasurfaces induce light phase shifts via spatially rotated identical nanostructures where each individual nanostructure acts as a half-wave plate. Propagation phase metasurfaces induce light phase shifts using linearly birefringent nanostructures with different lateral dimensions at each spatial position. The two approaches can also be used in combination.

SUMMARY

Optical metasurface polymeric films are described. These optical metasurface polymeric films may be formed on flexible substrates. The flexible substrate may be large format substrates having a lateral dimension greater than 300 mm, for example. These optical metasurface polymeric films may be formed utilizing roll-to-roll processing with high fidelity.

An optical metasurface film includes a flexible polymeric film having a first major surface, a patterned polymer layer having a first surface proximate to the first major surface of the flexible polymeric film and having a second nanostructured surface opposite the first surface, and a refractive index contrast layer including a refractive index contrast material adjacent to the nanostructured surface of the patterned polymer layer forming a nanostructured bilayer with a nanostructured interface. The nanostructured bilayer acts locally on an amplitude, phase, or polarization of light, or a combination thereof and imparts a light phase shift that varies as a function of position of the nanostructured bilayer on the flexible polymeric film. The light phase shift of the nanostructured bilayer defines a predetermined operative phase profile of the optical metasurface film.

The nanostructured bilayer may act locally on the amplitude of light. The nanostructured bilayer may act locally on the phase of light. The nanostructured bilayer may act locally on the polarization of light.

The nanostructured bilayer may be defined by solid materials. The nanostructured bilayer may be formed of solid materials. The nanostructured bilayer may be formed of polymeric materials.

The nanostructured bilayer may further include an etch stop layer separating the patterned polymer layer from the first major surface of the flexible polymeric film.

The refractive index contrast material may have a first refractive index value and the patterned polymer layer has a second refractive index value being at least 0.25 different than, or 0.5 different than, or 0.75 different than, or 1.0 different than, or 1.4 different than the first refractive index value.

The nanostructured bilayer may be defined by a plurality of nanostructures embedded into the refractive index contrast layer. The nanostructures forming the nanostructured surface may have an aspect ratio of at least about 1:1, 2:1, 5:1, 10:1 or 15:1. The nanostructures forming the nanostructured surface preferably may have an aspect ratio in a range of about 2:1 to about 20:1, or from about 4:1 to about 15:1.

The nanostructures forming the nanostructured surface may define a tapered sidewall having an angle in a range from about 1 to 10 degrees, 2 to 10 degrees, 3 to 10 degrees, 4 to 10 degrees, 1 to 6 degrees, 2 to 6 degrees, or 3 to 6 degrees, or 2 to 4 degrees. The nanostructures forming the nanostructured surface may define a tapered sidewall having an angle in a range from about 0 to 10 degrees, 0 to 6 degrees, 0 to 3 degrees, 0 to 2 degrees, 0 to 1 degree, or 0 degrees.

The refractive index contrast material may include a metal oxide or metal nitride. The refractive index contrast material may include at least one of titanium, zirconium, tantalum, hafnium, niobium, zinc, or cerium; an oxide of titanium, zirconium, tantalum, hafnium, niobium, zinc, or cerium; a nitride of titanium, zirconium, tantalum, hafnium, niobium, zinc, or cerium; a sulfide of titanium, zirconium, tantalum, hafnium, niobium, zinc, or cerium; or a combination thereof.

The patterned polymer layer may include a fluoropolymer, (meth)acrylate (co)polymer, or silica containing polymers. The patterned polymer layer may include fluoroacrylate and the refractive index contrast material may include titanium dioxide. The patterned polymer layer may include (meth)acrylate and the refractive index contrast material may include titanium dioxide.

The flexible polymeric film may have an average thickness in a range from about 5 micrometers to about 300 micrometers. The nanostructures forming the nanostructured surface may have a height of 5 micrometer or less, or in a range from about 100 nanometers to about 3000 nanometers, or from about 500 nanometers to about 1500 nanometers.

The nanostructures forming the nanostructured surface has an average pitch (center-to-center distance between adjacent nanostructures) that is subwavelength with respect to the shortest wavelength contained in the interrogating electromagnetic radiation. For optical metasurfaces operating in the visible spectral range, the nanostructures forming the nanostructured surface may have an average pitch of 600 nanometers or less, or 500 nanometers or less, or 400 nanometers or less. For optical metasurfaces operating in the visible spectral range, the nanostructures forming the nanostructured surface may preferably have an average pitch of 50 nanometers to 600 nanometers, or 100 nanometers to 500 nanometers, or 200 nanometers to 400 nanometers.

The nanostructures forming the nanostructured surface are each separated from each other by a subwavelength lateral distance. The nanostructures forming the nanostructured surface may be each separated from each other by about 400 nanometers or less, or in a range from about 20 nanometers to about 400 nanometers, or from about 50 nanometers to about 300 nanometers. The nanostructures forming the nanostructured surface have a lateral dimension orthogonal to a nanostructure feature height that is subwavelength. The nanostructures forming the nanostructured surface may have a lateral dimension orthogonal to a nanostructure feature height of about 600 nanometers or less, or in a range from about 10 nanometers to about 400 nanometers, or from about 50 nanometers to about 350 nanometers.

The light phase shift may occur in a visible light wavelength range. The light phase shift may occur in a near IR wavelength range. The optical metasurface film may transmit visible or near infrared light.

The nanostructures forming the nanostructured surface may have a varying orientation in the case of a geometric phase metasurface that depends on the location of the individual nanostructure on the flexible polymeric film. The nanostructures forming the nanostructured surface may have a varying spatial arrangement that depends on the location of the individual nanostructure on the flexible polymeric film. The nanostructures forming the nanostructured surface may have a varying shape in the case of a propagation phase metasurface that depends on the location of the individual nanostructure on the flexible polymeric film. The nanostructures forming the nanostructured surface may have a varying aspect ratio that depends on the location of the individual nanostructure on the flexible polymeric film.

The nanostructures forming the nanostructured surface may be geometrically anisotropic in a planar direction. The nanostructures forming the nanostructured surface may be geometrically isotropic in a planar direction.

DETAILED DESCRIPTION

Optical metasurface polymeric films are described. These optical metasurface polymeric films may be formed on flexible substrates. The flexible substrate may be large format substrates having a lateral dimension greater than 300 mm, for example. These optical metasurface polymeric films may be formed utilizing roll-to-roll processing with high fidelity.

The term "metasurface" refers to a two-dimensional sub-wavelength spacing or array of photonic resonators or truncated waveguides, which preform one or more optical functions. Each array locally acts on one or more physical properties of light, specifically, amplitude, phase, or polarization.

The photonic resonators or truncated waveguides representative nano-feature shapes include, but are not limited to, rectangular, triangular and trapezoidal prisms; fins, cylindrical and truncated-cone shaped pillars etc. The features may be placed with regular or randomized pitch, orientation and shapes, dependent on application-functionality and determined article design.

The term "nanostructure" refers to a feature having at least one dimension that is less than 1 micrometer.

The term "aspect ratio" refers to the ratio of feature height to feature width.

The term "refractive index" refers to the absolute refractive index of a material which is understood to be the ratio of the speed of electromagnetic radiation in free space to the speed of the radiation in that material, with the radiation being green light at a wavelength of about 532 nanometers (nm). The refractive index can be measured using known methods and is generally measured using an Abbe Refractometer.

The term "flexible polymeric film" refers to a polymeric film that may be elastically curved to a radius of curvatures of 52 mm or less.

The term "operative phase profile" refers to the phase profile that is imparted by the metasurface on the incident electromagnetic radiation. It is designed to carry out specific optical functions.

The phrase "land region thickness" refers to the height of a structured surface layer between its bottom surface and the plane defined by the bottom of the surface features. Also referred to as the residual layer or region.

The term "precision land" refers to structured surface layers with a deterministic, controlled land thickness. Two examples are a minimized land that enables subsequent etch steps and a land that will define the feature height in the final film. Ideally, the thickness of the residual layer thickness will be less than the feature height when the structured surface enables subsequent etch steps. When the land thickness defines the height of the features in the final film, the land layer thickness ideally has variability that is <25%, more preferably <10%, and most preferably <5% of the layer thickness.

The term "uncontrolled land" refers to structured surface layers with an arbitrary land thickness. Layer thickness variability may be >25%.

The metasurface polymeric film may be formed by any useful nano-replication technique. Nano-replication refers to a continuous thermal or photochemical process for creating a nanostructured surface layer using a cylindrical tool and a roll of polymeric support film with a thermoplastic (thermal) or UV-curable resin (photochemical) layer. One illustrative nano-replication technique is nanoimprint lithography (NIL).

Nanoimprint lithography (NIL) is a high-throughput technique for patterning of polymer nanostructures at great precision and low cost. Unlike traditional lithographic approaches which achieve pattern definition by photon or electron beam exposure of a resist layer to modify the chemical and physical properties of the resist, NIL relies on the use of a stamp in a direct mechanical deformation of the resist material. The stamp is made from a master wafer and can be re-used in a rapid process to produce many copies of the original pattern.

Optical applications for direct view electronic displays (especially display light control films for high resolution, full color displays) utilize, for example, substrate transparency, low retardance, high optical efficiency, and a low cost per unit area. The limited size of standard wafer substrates (typically utilized with NIL) and their high unit cost make them generally unsuitable for use in direct view consumer displays as light enhancement elements, diffusers, polarizers. Wafer level optics are usually relegated to micro-optical components with limited dimensions such as microlens arrays, diffraction gratings, and waveguide optics.

While display glass panels of large dimension (>1 m×1 m) are used to fabricate display backplanes, the patterning techniques and equipment (usually optical lithography steppers) have limited resolution and cannot be used to create nanostructured features. The use of polymer film substrates with engineered nanostructured surfaces enables nanopatterned parts with dimensions beyond that of semiconductor wafers, which are practically limited to 300 mm in diameter or less. Nanopatterned polymer films may have dimensions on the order of 1 m wide by 1 km long or indefinite length. The polymer films can provide the transparency across the visible and NIR spectrum required for many applications.

Optical metasurface polymeric films utilize the design of subwavelength structures or features that impart an abrupt phase shift at the interface of the subwavelength structures and the surrounding medium. Arranging these sub-wavelength structures or features on the polymeric film provides an operative phase profile of the optical metasurface film. Thus, a predetermined operative phase profile of the optical metasurface film may be modeled to determine the arrangement of these sub wavelength structures or features on the polymeric film.

Optical metasurface polymeric films are described. These optical metasurface polymeric films may be formed on flexible substrates. The flexible substrate may be large format substrates having a lateral dimension greater than 300 mm, or greater than about 400 mm, or greater than about 500 mm, for example. The flexible substrate may form a web of indefinite length. These optical metasurface polymeric films may be formed utilizing roll-to-roll processing with high fidelity.

Metasurfaces may utilize the design of subwavelength structures that can impart abrupt phase shifts at an interface. In particular, a phase gradient (dΦ/dx) along a path on the interface ($\vec{x}$) leads to the generalized Snell's law of refraction:

$$n_t \sin(\theta_t) - n_i \sin(\theta_i) = (\lambda_0/2\pi)(d\Phi/dx),$$

where $n_i$ and $n_t$ are the refractive indices experienced by the incident and transmitted light, $\theta_i$ and $\theta_t$ the angle of incidence and refraction, and $\lambda_0$ the incident wavelength in vacuum, respectively. Therefore, implementing such a phase discontinuity at an interface allows for the creation of anomalous refraction.

Although there are many ways of designing an element that can impart a phase discontinuity for a functional metasurface, here the Pancharatnam-Berry phase (or geometric phase) approach is utilized as an example for designing a metasurface. This allows us to use a single element with different orientation angles, which greatly reduces the number of optimization parameters. Furthermore, since the generated phase solely depends on the rotation angle of the basic nanostructure, this approach is very robust against fabrication errors since rotation angles are typically a well-controlled parameter in fabrication compared to the structure dimensions.

To realize a Pancharatnam-Berry phase metasurface, rectangular $TiO_2$ nanofins with different widths (W), lengths (L), and heights (H) are modeled. Typically, H is constant across the entire metasurface, as this facilitates fabrication. However, this is not a necessary condition.

As light propagates through a nanofin in +z-direction, it experiences different effective refractive indices along W- and L-directions, respectively. For certain W and L sizes, the nanofin acts as a half-wave plate (HWP), i.e., linearly-polarized light propagating along one principal axis will experience a π phase-shift relative to linearly-polarized light propagating along the other principal axis.

Therefore, the nanofin converts right-circularly polarized (RCP) light (which can be decomposed into two orthogonal linear polarization states with a relative+π/2 phase difference) to left-circularly polarized (LCP) light (which can be decomposed into two orthogonal linear polarization states with a relative−π/2 phase difference), and vice versa. If the nanofin dimensions deviate from the ideal parameters that render it a half-wave plate, circularly polarized light will only be partially converted to its opposite handedness.

To realize this metasurface a parameter sweep of $TiO_2$ nanofin dimensions may be performed in order to find structure dimensions for an efficient HWP. The sweep may be performed for different dielectric environments where the nanofin is surrounded by either air or various embedding polymers or materials. In addition to nanofins with vertical sidewalls, nanofins with varying sidewall draft angles (taper angles) may be utilized to reflect the fabrication constraints dictated by the direct replication fabrication route.

A commercially available finite-difference time-domain (FDTD) solver by Lumerical Inc. may be utilized to simulate and analyze the properties of the nanofins and determine the optimal nanofin geometries, which satisfy fabrication constraints and act as an HWP. The FDTD solver provides time-step solutions to Maxwell's equations with boundary conditions specified by the user. The results may be analyzed in the frequency-domain after Fourier transformation of the time-domain solutions.

Measurements may be performed at a wavelength of 532 nm, which is roughly in the center of the visible spectrum and facilitates subsequent measurements using a widely available green laser.

The size of the simulation mesh—the spacing between the discrete positions where Maxwell's equations are solved for each time-step—may be set to 10 nm in x, y, and z dimensions to minimize the stair-casing effect, which is introduced by the Cartesian grid used in the FDTD method. The described simulation setup may demonstrate a Pancharatnam-Berry phase $TiO_2$ nanofin metasurface operating in the visible spectrum.

In order to find optimum nanofin dimensions in different embedding materials, parameter sweeps for different nanofin dimensions and sidewall tapering angles may be performed. The nanofins are assumed to be embedded in an optical resin. Incident light may be set to be coming from the substrate side, with RCP polarization, propagating toward the nanofins. The electric and magnetic field data of the transmitted light may be collected about a wavelength away from the top of the nanofins. A far-field transform then yields the amplitude and polarization information of the transmitted light. By comparing the relative phase and amplitude of x- and y polarized light of the transmitted light in the far-field to a reference geometry, which contains only the quartz substrate without nanofins, each nanofin's RCP to LCP conversion efficiency and its transmission amplitude may be measured. For each combination of embedding materials and sidewall tapering angles, nanofin dimensions that most closely produce HWP behavior and, therefore, yield the highest conversion efficiencies for circularly polarized light may be determined.

Figure 1:
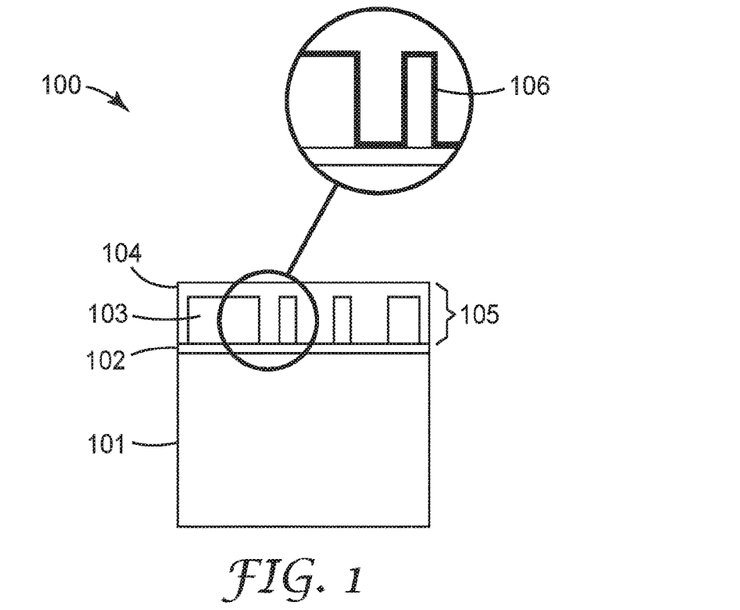
FIG. 1 is a cross-sectional schematic diagram of an illustrative optical metasurface film.
Figure 2:
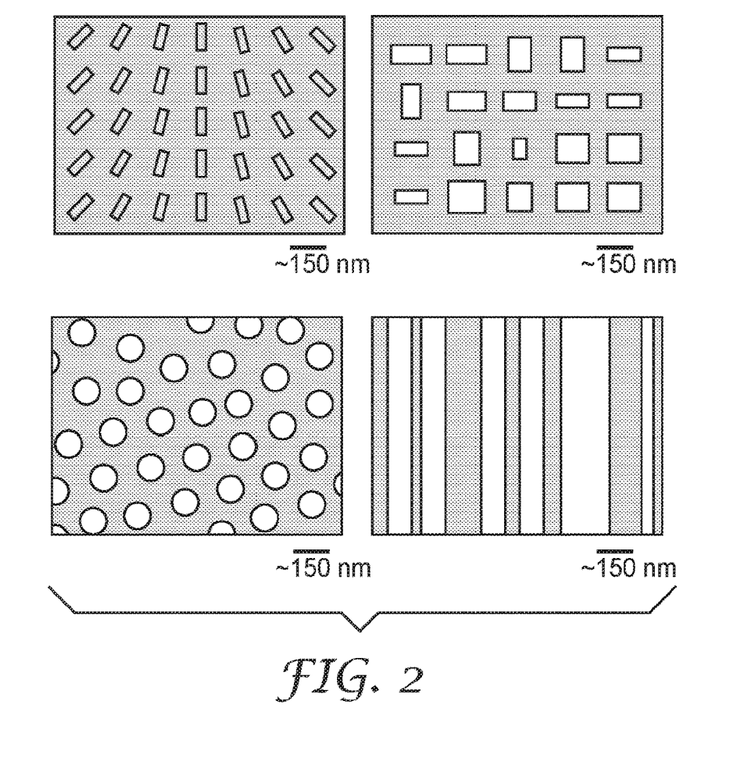
FIG. 2 illustrates top elevation schematic diagrams of four representative optical metasurface films.

FIG. 1 is a cross-sectional schematic diagram of an illustrative optical metasurface film 100. FIG. 2 illustrates top elevation schematic diagrams of four representative optical metasurface films. The optical metasurface film may include one or more aspects of the representative optical metasurface films illustrated in FIG. 2. The optical metasurface films illustrated in FIG. 2 are non-limiting illustrative nanostructure topography.

An optical metasurface film 100 includes a flexible polymeric film 101 having a first major surface, a patterned polymer layer 103 having a first surface proximate to the first major surface of the flexible polymeric film 101 and having a second nanostructured surface opposite the first surface, and a refractive index contrast layer 104 including a refractive index contrast material adjacent to the nanostructured surface of the patterned polymer layer 103 forming a nanostructured bilayer 105 with a nanostructured interface 106. The nanostructured bilayer 105 acts locally on an amplitude, phase, or polarization of light, or a combination thereof and imparts a light phase shift that varies as a function of position of the nanostructured bilayer 105 on the flexible polymeric film 101. The light phase shift of the nanostructured bilayer 105 defines a predetermined operative phase profile of the optical metasurface film 100.

The nanostructured bilayer may further include an etch stop layer 102 separating the patterned polymer layer 103 from the first major surface of the flexible polymeric film 101. The etch stop layer may be an etch resistant layer that is used to define a common etch depth during a wet or dry etch process. The etch stop layer 102 may have a thickness of greater than 2 nm and up to about 25 nm. The etch stop layer may be formed of metals and their oxides and nitrides including oxides or nitrides of Si, Al, Ti, Zr, Ta, Hf, Nb, Ce, and mixtures thereof.

The nanostructured bilayer may act locally on the amplitude of light. The nanostructured bilayer may act locally on the phase of light. The nanostructured bilayer may act locally on the polarization of light. The nanostructured bilayer may act locally on both the amplitude of light and the phase of light. The nanostructured bilayer may act locally on both the amplitude of light and the polarization of light. The nanostructured bilayer may act locally on both the phase of light and the polarization of light.

The flexible polymeric film may be formed of a thermoplastic material. The flexible polymeric film may be formed of polyester, co-polyester, polycarbonate, polyurethane, poly(methyl methacrylate), polystyrene, polyimide, polyethylene napthalate, polyproplyene, polycyclo-olefins, preferred polyester and polycarbonate. The flexible polymeric film may have a uniform thickness. The flexible polymeric film may have an average thickness in a range from about 5 micrometers to about 300 micrometers. The flexible polymeric film may have a uniform thickness in a range from 10 micrometers to 250 micrometers, or from 25 micrometers to 125 micrometers. The flexible film may exhibit optical retardance.

The nanostructured bilayer may be defined by solid materials. The nanostructured bilayer may be formed of solid materials. The nanostructured bilayer may be formed of polymeric materials.

The patterned polymer layer may be formed of thermoplastic material. The patterned polymer layer may be formed of poly(methyl methacrylate), polycarbonate, polypropylene, polyethylene, polystyrene, polyester, polyamide. The patterned polymer layer may be formed of polymerizable compositions comprising acrylate or methacrylate components. The patterned polymer layer may include a fluoropolymer, (meth)acrylate (co)polymer, or silica containing polymers.

The refractive index contrast material may have a first refractive index value and the patterned polymer layer has a second refractive index value being at least 0.25 different than, or 0.5 different than, or 0.75 different than, or 1.0 different than, or 1.4 different than the first refractive index value.

The refractive index contrast material may have a first refractive index value in a range from 1.7 to 2.5. The patterned polymer layer has a second refractive index value in a range from 1.2 to 1.6.

The refractive index contrast material may include a metal oxide or metal nitride. The refractive index contrast material may include at least one of titanium, zirconium, tantalum, hafnium, niobium, zinc, or cerium; an oxide of titanium, zirconium, tantalum, hafnium, niobium, zinc, or cerium; a nitride of titanium, zirconium, tantalum, hafnium, niobium, zinc, or cerium; a sulfide of titanium, zirconium, tantalum, hafnium, niobium, zinc, or cerium; or a combination thereof.

The patterned polymer layer may include fluoroacrylate and the refractive index contrast material may include titanium dioxide. The patterned polymer layer may include (meth)acrylate and the refractive index contrast material may include titanium dioxide.

The nanostructured bilayer may be defined by a plurality of nanostructures embedded into the refractive index contrast layer. The nanostructures forming the nanostructured surface may have an aspect ratio of at least about 1:1, 2:1, 5:1, 10:1 or 15:1. The nanostructures forming the nanostructured surface preferably may have an aspect ratio in a range of about 2:1 to about 20:1, or from about 4:1 to about 15:1.

The nanostructures forming the nanostructured surface may define a tapered sidewall having an angle in a range from about 1 to 10 degrees, 2 to 10 degrees, 3 to 10 degrees, 4 to 10 degrees, 1 to 6 degrees, 2 to 6 degrees, or 3 to 6 degrees, or 2 to 4 degrees. The nanostructures forming the nanostructured surface may define a tapered sidewall having an angle in a range from about 0 to 10 degrees, 0 to 6 degrees, 0 to 3 degrees, 0 to 2 degrees, 0 to 1 degree, or 0 degrees.

The nanostructures forming the nanostructured surface may have a height of 5 micrometer or less, or in a range from about 100 nanometers to about 3000 nanometers, or from about 500 nanometers to about 1500 nanometers.

The nanostructures forming the nanostructured surface has an average pitch (center-to-center distance between adjacent nanostructures) that is subwavelength with respect to the shortest wavelength contained in the interrogating electromagnetic radiation.

For optical metasurfaces operating in the visible spectral range, the nanostructures forming the nanostructured surface may have an average pitch of 600 nanometers or less, or 500 nanometers or less, or 400 nanometers or less. For optical metasurfaces operating in the visible spectral range, the nanostructures forming the nanostructured surface may preferably have an average pitch of 50 nanometers to 600 nanometers, or 100 nanometers to 500 nanometers, or 200 nanometers to 400 nanometers.

The nanostructures forming the nanostructured surface are each separated from each other by a subwavelength lateral distance. The nanostructures forming the nanostructured surface are each separated from each other by about 400 nanometers or less, or in a range from about 20 nanometers to about 400 nanometers, or from about 50 nanometers to about 300 nanometers.

The nanostructures forming the nanostructured surface have a lateral dimension orthogonal to a nanostructure feature height that is subwavelength. The nanostructures forming the nanostructured surface may have a lateral dimension orthogonal to a nanostructure feature height of about 600 nanometers or less, or in a range from about 10 nanometers to about 400 nanometers, or from about 50 nanometers to about 350 nanometers.

The light phase shift may occur in a visible light wavelength range. The light phase shift may occur in a near IR wavelength range. The optical metasurface film may transmit visible or near infrared light.

The nanostructures forming the nanostructured surface may have a varying orientation that depends on the location of the individual nanostructure on the flexible polymeric film. The nanostructures forming the nanostructured surface may have a varying spatial arrangement that depends on the location of the individual nanostructure on the flexible polymeric film. The nanostructures forming the nanostructured surface may have a varying shape that depends on the location of the individual nanostructure on the flexible polymeric film. The nanostructures forming the nanostructured surface may have a varying aspect ratio that depends on the location of the individual nanostructure on the flexible polymeric film.

The nanostructures forming the nanostructured surface may be geometrically anisotropic in a planar direction. The nanostructures forming the nanostructured surface may be geometrically isotropic in a planar direction.

Figure 3:
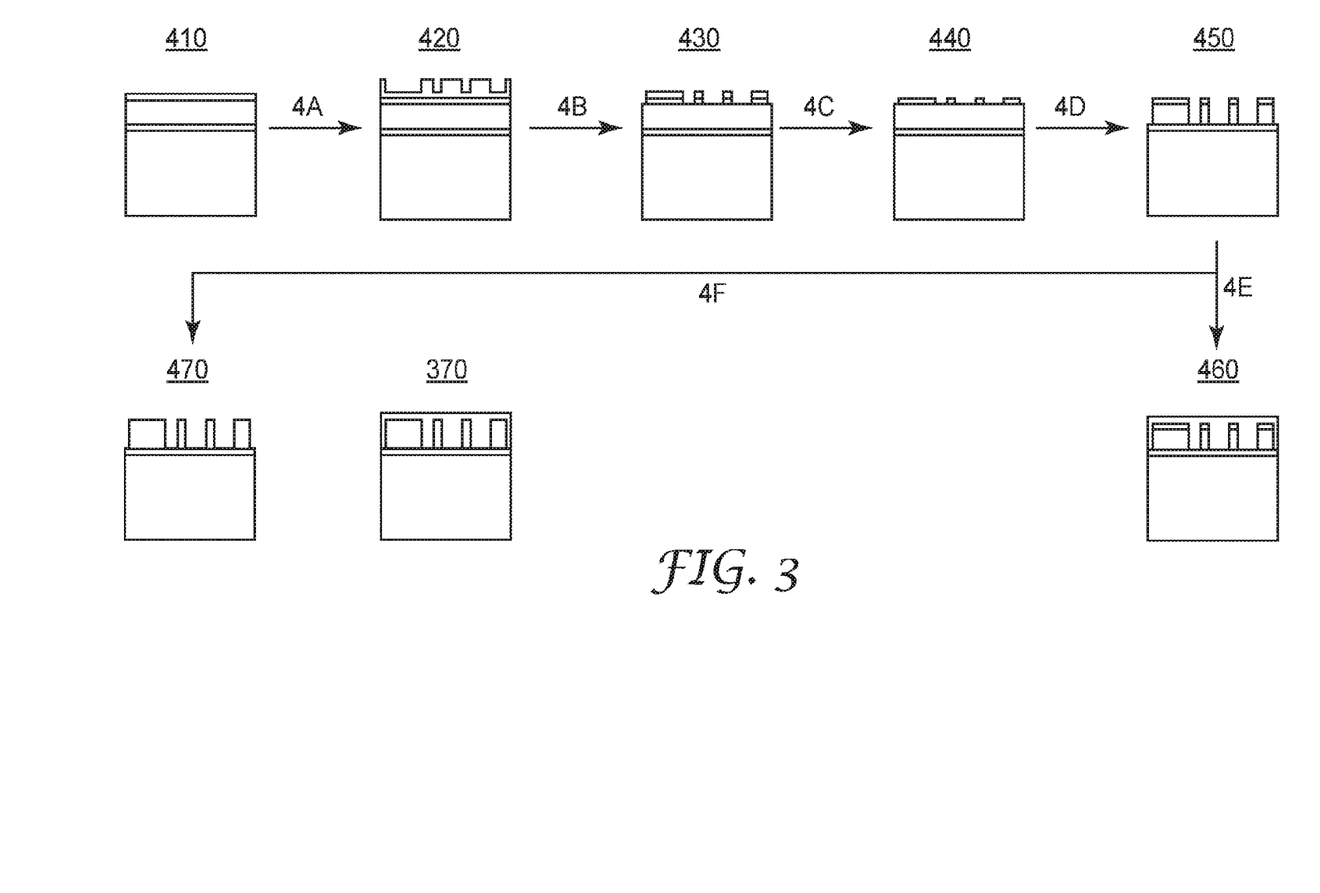
FIG. 3 illustrates a cross-sectional schematic diagram of an illustrative method of forming an illustrative optical metasurface film.

FIG. 3 illustrates a cross-sectional schematic diagram of an illustrative method of forming an illustrative optical metasurface film.

This fabrication route utilizes a hard mask layer that also functions as a second etch stop layer. The inclusion of a hard mask layer has four beneficial effects. First, it reduces or eliminates the requirement for a near zero land resist replication process since the etch of the thin hard mask layer does not require a high aspect ratio resist feature. Second, the nanoreplicated resist material can be an acrylate resin formulation rather than a silicon-rich hybrid material. Third, the hard mask etch process enables the formation of deep vias with vertical sidewalls (important for optical metasurface applications). Finally, the construction allows for the use of a low refractive index pattern transfer layer (e.g., a fluoroacrylate) since the vapor deposition step for the hard mask layer forms a well-adhered layer inorganic layer with good wettability for the nanoreplicated resin layer.

It utilizes an input roll for the nanoreplication process comprising a polymeric support film, and an etch stop layer, a precision pattern transfer layer, and a hard mask layer. It requires a process such as roll-to-roll nanoimprint lithography (R2R NIL) to form a near zero land structured etch resist layer in the first process step, but the land control can be relaxed. Since the construction is etched through the entire pattern transfer layer thickness, the layer thickness ultimately defines the feature height in the final article. The process is useful if both the feature height uniformity and the absolute feature height of the surface features in the final article is critical (e.g., for optical metasurface applications) and embedded optical elements with a low refractive index organic layer and a higher refractive index metal oxide backfill layer.

The material used for the pattern transfer layer may be utilized as either the low or high refractive index material in the embedded optical element.

A film comprising a polymeric support film, an etch stop layer, a precision pattern transfer layer, and a hard mask layer 410 is utilized as the input roll for a R2R NIL or continuous cast and cure (process 4A, "R2R NIL"). Nanoreplicated film 420 is etched in a reactive ion etch (RIE) process until the top surface of the hard mask layer has been exposed (process 4B, "breakthrough etch") to produce intermediate 430. Some resin residue may remain after this step and can be removed in an optional additional RIE step (process 4C). Hard mask patterned intermediate 440 is further etched in a second RIE process using a second etch chemistry until the pattern transfer layer is etched through to the etch stop layer (process 4D). Etched nanopatterned film with hard mask residue 450 can be either planarized with a high refractive index backfill to form embedded nanopatterned optical film 460 (process 4E) or subjected to different etch conditions to remove the hard mask residue to form unfilled nanopatterned optical film 470 (process 4F). Finally, unfilled nanopatterned optical film 470 can be planarized with a high refractive index backfill to form embedded nanopatterned optical film 370.

EXAMPLES

Materials

| Description | Component | Source |
|---|---|---|
| N-(n-Butyl)-3-aminopropyltrimethoxysilane | Dynasilan 1189 | Evonik in Essen, Germany |
| Urethane acrylate oligomer | PHOTOMER 6010 | BASF, Florham Park, NJ |
| Ethoxylated (4) bisphenol A diacrylate | SR601 | Sartomer Americas, Exton, PA |
| Ethoxylated (10) bisphenol A diacrylate | SR602 | Sartomer Americas, Exton, PA |
| (tripropyleneglycoldiacrylate) | SR306HP | |
| Tetrahydrafurfuryl acrylate | SR285 | Sartomer Americas, Exton, PA |
| Trimethylopropane triacrylate | SR351 | Sartomer Americas, Exton, PA |
| TRICYCLODECANE DIMETHANOL DIACRYLATE | SR833 S | Sartomer Americas, Exton, PA |
| Propoxylated (2) neopentyl glycol diacrylate | SR9003 | Sartomer Americas, Exton, PA |
| 2-Phenoxyethyl acrylate | ETERMER 210 | Toagosei America Inc., West Jefferson, OH |
| Diphenyl(2,4,6- trimethylbenzoyl)phosphine oxide | IRGACURE TPO | BASF, Florham Park, NJ |
| Methanone, (1-hydroxycyclohexyl)phenyl- | Irgacure 184 | |
| 2-Hydroxy-2-methyl-l-phenyl-propanone | DAROCUR 1173 | BASF, Florham Park, NJ |
| 2-Propenoic Acid, 2-(4-benzoylphenoxy) ethyl ester (disclosed in U.S. Pat. No. 4,847,137) | AEBP | |
| Solvent | Toluene | Sigma-Aldrich, Milwaukee, WI |
| Solvent | Methanol | Sigma-Aldrich, Milwaukee, WI |
| Solvent | Ethyl Acetate | Sigma-Aldrich, Milwaukee, WI |
| Solvent | methyl ethyl ketone | Sigma-Aldrich, Milwaukee, WI |
| Hexamethyldisiloxane - PRODUCT CODE: | HMDSO | Gelest, Inc. |

| Description | Component | Source |
|---|---|---|
| SIH6115.0; CAS NO: 107-46-0 | | 11 East Steel Road, Morrisville, PA 19067 |
| Photomer 6010, SR602, SR601, SR351, and Etermer 210 were combined in a weight ratio of 60/20/4/8/8 to produce a curable resin. Irgacure TPO and Darocur 1173 were added in respective weight ratios of 0.35 and 0.1 parts per 100 parts of resin. (from U.S. Pat. No. 9,910,192 Example 4) | Compound 01 | |
| 2-(3-trimethoxysilylpropyl-carbamoyloxy)ethyl prop-2-enoate example 7 of U.S. Pat. No. 9,790,396 | Compound 02 | |
| a polymerizable resin made by mixing 0.5% (2,4,6 trimethyl benzoyl) diphenyl phosphine oxide into a 75:25 blend of PHOTOMER 6210 and SR238. Disclosed in US2013/0211310 A1 | Compound 03 | |
| Oligomeric hexafluoropropylene oxide diacrylate, preparation disclosed in US9718961B2 col. 16 lines 33-67 | Compound 04 | |
| Prepared according to Preparation No. 6., US7718264B2 column 25 lines 35-56 with the same starting materials in the same molar ratios, by a similar method, substituting acetone at 65% solids for methyl ethyl ketone at 50% solids | Compound 05 | |

All concentrations are weight percent

Example 1. Functional Blazed Grating Made by Four-Layer Method with Low-Residual Transfer on PETg

| Material | Description | |
|---|---|---|
| PET Film 1 | ST504 | DU PONT TEIJIN FILMS, Hopewell, VA |
| PET Film 2 | ST505 | DU PONT TEIJIN FILMS, Hopewell, VA |
| Polycarbonate film | 125 micron thick polycarbonate film with a gloss surface finish on both sides obtained from Tekra, Inc., New Berlin, WI | |
| PET-g film | WO2019/032635 | A film as described in PCT application WO2019032635 A1, Examples 7, 8 and 9 except that the first C layer was excluded giving a 4 layer A/D/B/C configuration. Material inputs for the layer stack are the same as in Table 4 except that A layer was PET (0.62 IV crystallized PET) at 1000 lb/hr, D layer was a linear triblock copolymer based on styrene and ethylene/butylene (G1645 from Kraton Corp. Belpre, Ohio) at 60 lb/hr; B layer was a 60:40 blend of polypropylene (PP9074MED from ExxonMobil, Irving, Texas, U.S.) and a linear triblock copolymer based on styrene and ethylene/butylene (G1645 from Kraton Corp. Belpre, Ohio) at 60 lb/hr, C layer was PETg (Eastar GN071 from Eastman Corp., Kingston TN) at 348 lb/hr. |

All concentrations are percent by weight

Step a: Replication of Nano-Featured Template Film

Figure 4:
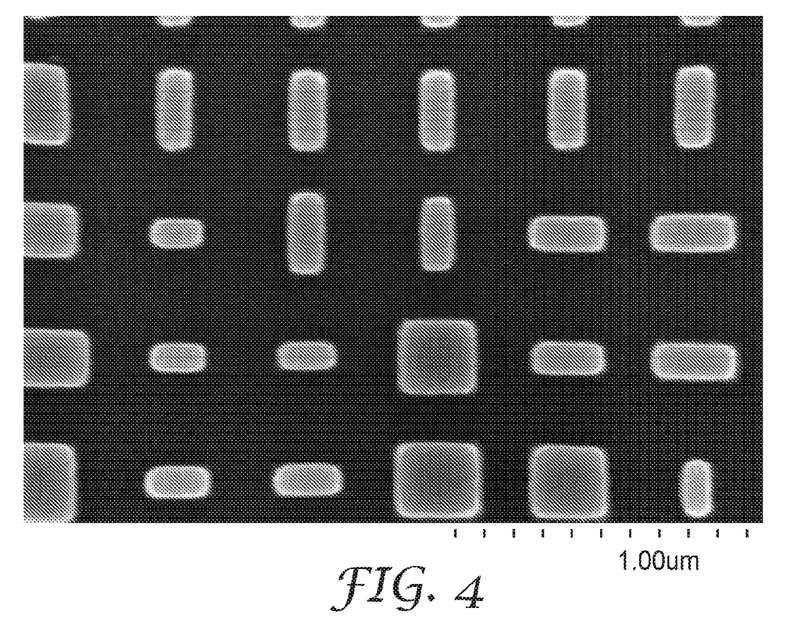
FIGS. 4-14 are images for the Examples.

Compound 01 with 0.5% AEBP was fed through a peristaltic pump into a die and onto a 5 mil polycarbonate film. The resin coated film was nipped against a round nickel sleeve controlled at 140 degrees F. which had a nano-scale pattern welded into it. Features ranged from 100 nm-350 nm on a side and were 200 nm tall. Nominally zero vertically draft. While in contact with the nickel sleeve, the resin coated film is exposed to radiation from two Fusion lamps operating at 142 W/cm. The nanostructured film was then peeled from the round nickel sleeve. The process is run continuously at 25 fpm for over 1000 feet. FIG. 4 is a 50 kX top view image of replicated features on the nanoreplicated resist-transfer film and shows a sample area.

Step b: Release Treatment of Nano-Featured Template Film

Tooling film from step (a) was release treated using PECVD. First the film was primed by flowing $O_2$ into the chamber at 500 cfpm at 2000 W plasma power at 30 fpm.

Figure 5:
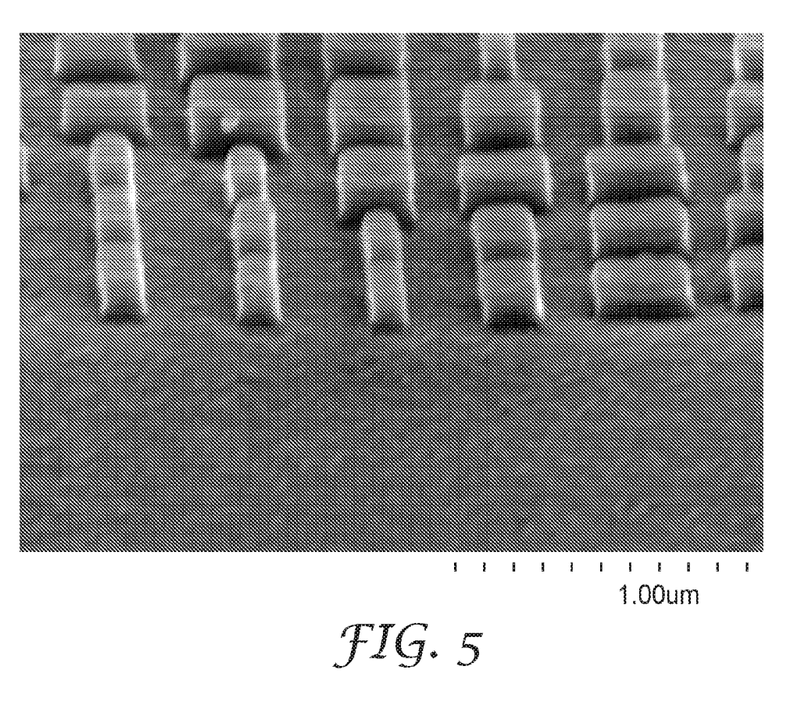

The film was then treated with HMDSO at 1000 Watts at 30 fpm. FIG. 5 is a 50 kX perspective view image of release-treated replicated features.

Step c: Coat Acrylate onto Template Film

The release treated tooling film (b) was die coated with a solution of 13% Compound 03 1% Compound 05, 43% MEK and 43% Dowanol PM at 10 fpm. The coating is pre-cured with a UV-LED system run at 0.2 Amps within 30 s of coating. A very thin residual layer was desired, so that the residual layer thickness can be controlled to be between zero and 500 nm with jig precision using a premetered coating method. This coating method uses a solution which is at least 50% solvent.

Step d: Drying Acrylate onto Tooling Film

The solvent was allowed to evaporate off of the film (c) in a 40 foot free-span. To prevent disturbing the wet film, no heat or convection was used to dry off the solvent.

Step e: Creation of Three-Layer Film (to be Laminated onto the Acrylate Coated Template Film)

As this film is part of the final construction, a PET-g film is chosen, due to its low in-plane retardance as dictated by the optical design. This PET-g film is described in filing WO2019032635A1, FIG. 2. FIG. 2 is a side view of a four-layer film having an ADBC layer configuration. Film includes the following layers in the configuration as shown: an orienting Layer A; a tie Layer D; a peel Layer B; and an isotropic Layer C. Wherein the orienting layer A is a polyester (PET); the tie layer D is a linear triblock copolymer based on styrene and ethylene/butylene (G1645 from Kraton Corp.); the peel layer B is a blend of polypropylene (PP9074MED from ExxonMobil) and a linear triblock copolymer based on styrene and ethylene/butylene (G1645 from Kraton Corp.); the isotropic Layer C is PETg (Eastar GN071 from Eastman Corp.). This configuration of film provides the additional capability of controlling where the first separation of layers will occur, in this case between the Layers B and C.

SiAlOx was deposited by dual-cathode AC reactive sputtering from a 90% Si/10% Al target in a $O_2$/Ar atmosphere at 1.5 mtorr and a plasma power of 16 kW. Coating speed was 16 fpm to achieve a 25 nm thick coating. The acrylate was deposited by the vapor deposition process as disclosed in U.S. Pat. No. 9,302,291. A mixture of 88% SR833, 4% Compound 02, and 4% Dynasilan 1189 and 4% Irgacure 184 as the photoinitiator were fed into an evaporator, and steady flow of vapor passed through a coating die to a chilled substrate moving at 24 fpm, where the mixture condensed and was immediately cured by either UV or low-voltage ebeam. Compound 02 and Dynasilan were used to promote adhesion between the SiAlOx and the acrylate. The final thickness of the acrylate layer was 1100 nm. Another 25 nm layer of SiAlOx was deposited on top of the acrylate layer in the same manner as the first layer.

Step f: Adhesion Promoter on Top of SiAlOx (to Facilitate Adhesion of Tri-Layer Sandwich to the Low-Land Patterned Acrylate)

7.5 nm of Compound 02 was die coated out of MEK on the SiAlOx at 20 fpm. The solvent was evaporated and the film was annealed at 200 F for 1.5 minutes. The Compound 02 was then cured using a fusion E bulb Step g: Lamination Coated tooling film was laminated to SiAlOx+Compound 02 film with a 90 durometer nip and a water-heated roll set at 170 F at 10 fpm. The film was then cured with a 600 W fusion H bulb.

Step h: Peeling

Figure 6:
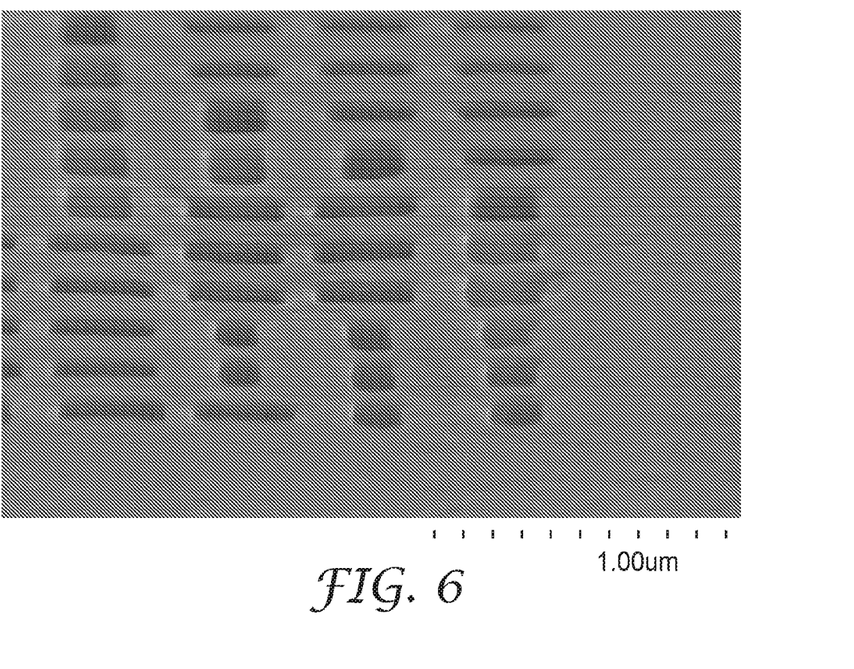
Figure 7:
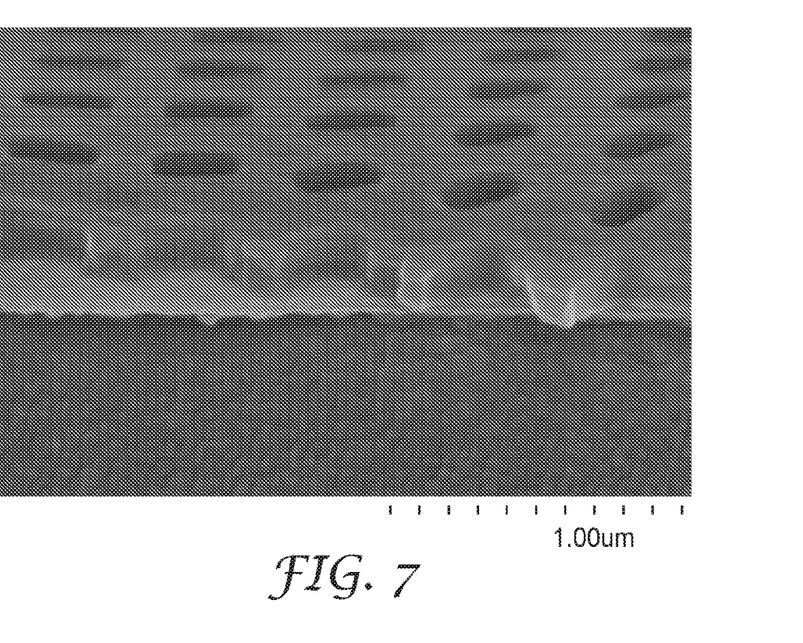

The structured acrylate was peeled from the structured HMDSO film onto the SiAlOx film shortly after the water-heated roll (web twists were minimized to reduce strain). All films were tensioned at approximately 1 pli, still running at 10 fpm. FIG. 6 is a 50 kX perspective view image of structured acrylate peeled onto SiAlOx/Acrylate/SiAlOx on PETG (the low-land film). FIG. 7 is a 50 kX cross-sectional view image of pre-etch, or pre-breakthrough. Note extremely low residual layer thickness exposed top mask layer in vias.

Steps i and j: Etching Residual Layer and Breakthrough SiAlOx Mask

These steps can be done either separately, as an oxygen etch followed by a fluorine etch, or subsequently during a single fluorine etch. The latter path was chosen here. In this case, the reactive ion etch was performed with 100 sccm of NF3, at 7500 watts run at 12.5 ft/min at a pressure of 3 mTorr.

Step k: Break-Through Etch

Figure 8:
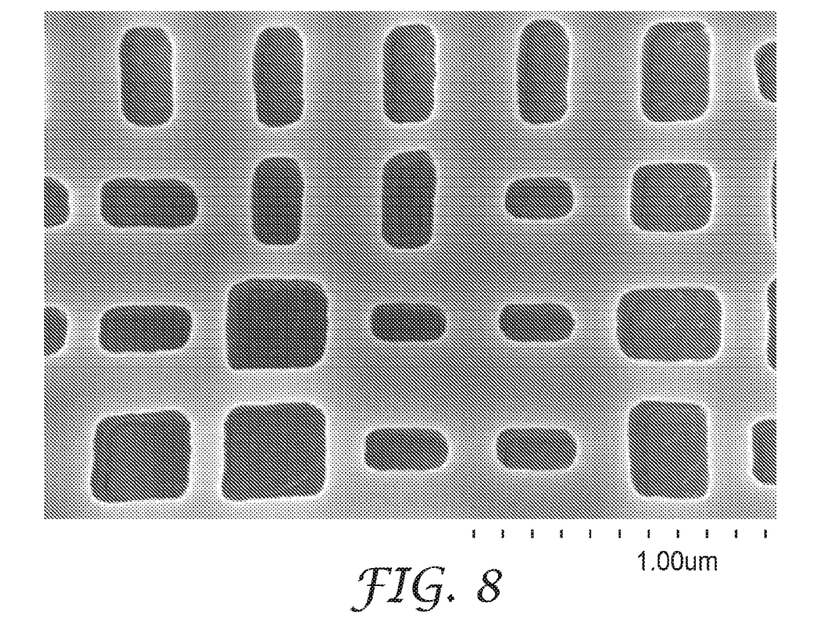
Figure 9:
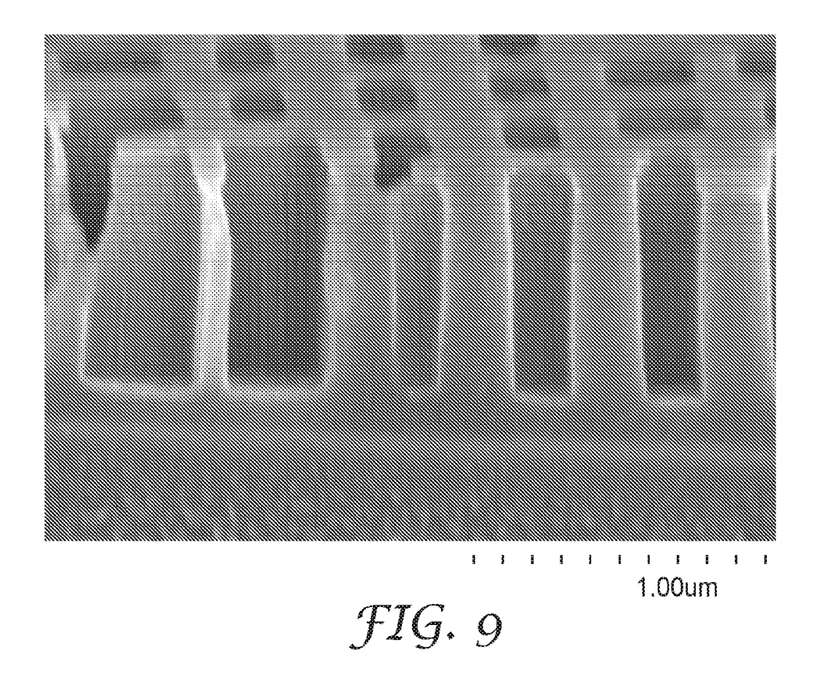

A second reactive ion etch with 700 sccm of $O_2$ at 0.3 mTorr base pressure at 7500 watts run at 15 ft/min at a pressure of 5.2 mTorr removed the transfer layer in the sections where the mask had been removed. FIG. 8 is a 50 kX top view image of the nanolith-patterned film following the break-through etch. FIG. 9 is a 50 kX cross-sectional view image of the post-$O_2$ etch sample.

Step l: High Index Back-Fill

Figure 10:
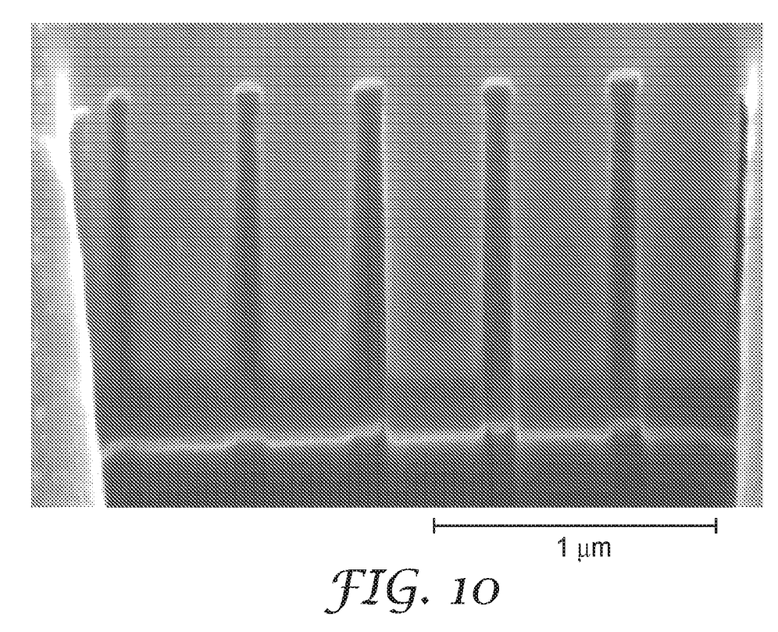

Etched high-aspect ratio features was processed in a spatial rotary ALD machine. $TiO_2$ was deposited using titanium tetraisopropoxide (TTIP) heated to 65 C (passive delivery), and a DC plasma discharge (350 mA) in an environment of 1 torr $N_2$ and 0.3 torr $O_2$. The chamber and substrate were heated to 80 C. The substrate was secured to a platen rotating at 30 RPM, with one precursor and plasma exposure per revolution, for a total of 4688 ALD cycles to yield a $TiO_2$ layer 217-nm in thickness, and having a refractive index of 2.33, measured at a wavelength of 632 nm. FIG. 10 is a 50 Kx cross-sectional SEM view image of TiO2 back-filled sample. In this image, the lighter regions are the $TiO_2$, and the darker regions are acrylate resin.

Figure 11:
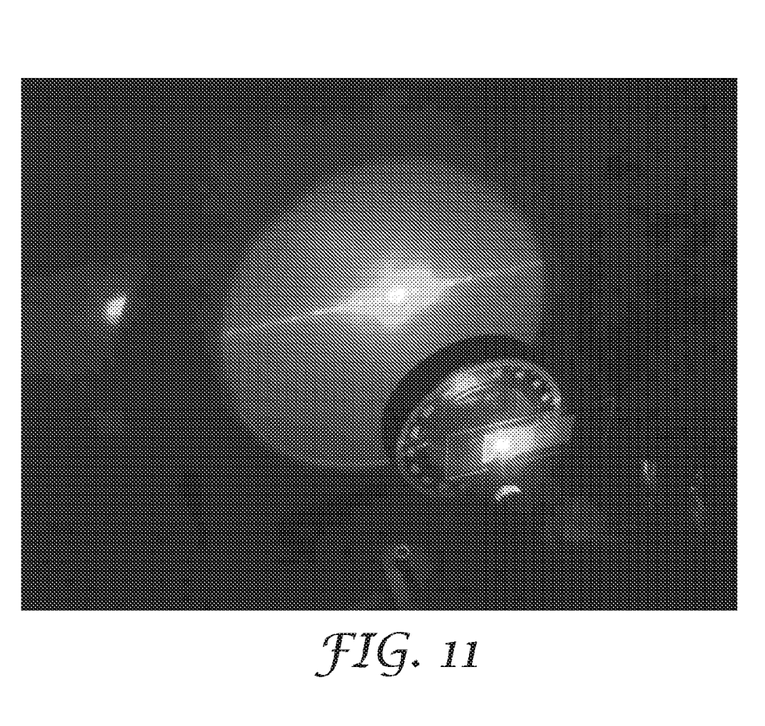
Figure 12:
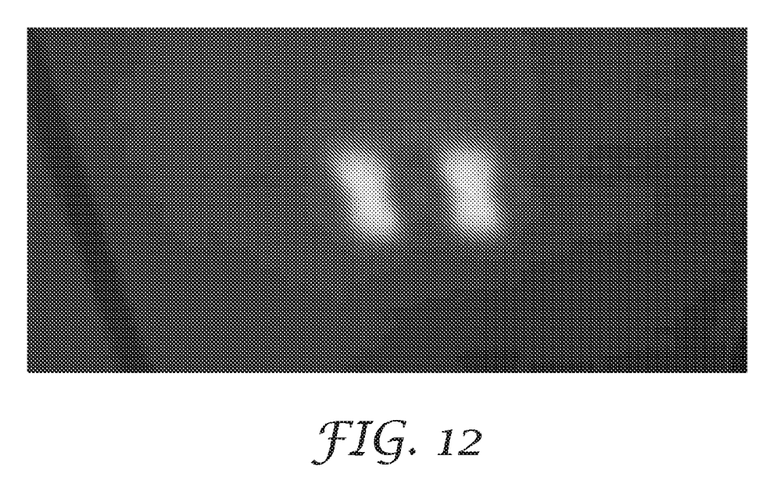

Analysis of Optical Images (FIGS. 11 and 12)

Blazed gratings were analyzed using a laser, where the sample was placed between two orthogonal linear polarizers. The blazed grating optical metamaterial sample on PET Film 1 (DuPont ST504) showed multiple peaks due to in-plane optical retardance of \delta n=0.048. The spurious points were eliminated on the low optical retardance PETg sample (FIG. 12). Note that the "fuzzy" spots observed in FIG. 12 result from thermal degradation of the PETg during ALD coating at 100 C.

Example 2: Using Low-Index Compound as Transfer Layer

The purpose of the low index material is to increase optical performance by increasing the change in index of refraction between the $TiO_2$ and the embedded resin. In the step E Creation of the Three-Layer film: A fluorinated low-index material, Compound 04, was used in place of the 1100 nm acrylate. A PET Film 2 was used instead of PETg, although this should be immaterial for processing purposes. 25 nm of SiAlOx base etch stop was sputtered onto a PET (ST505) film. The etch stop layer was then vapor coated with a layer of 96% Compound 02 and 4% Darocur 1173 approximately 15 nm thick. A linespeed of 65 fpm was held while maintaining the backside of the film in contact with a coating drum chilled to 0° C. With the backside in contact with the drum, the SiAlOx surface was treated with a dc nitrogen plasma at 100 W and a nitrogen pressure of 150 mTorr. Immediately after the nitrogen plasma treatment, the SiAlOx surface was then coated with Compound 02/Darocur 1173 using an organic vapor deposition system and method described in U.S. Pat. No. 8,658,248. The monomer was degassed under vacuum to a pressure of 20 mTorr prior to coating. This liquid was pumped into an ultrasonic atomizer at a liquid flowrate of 0.1 ml/min using a syringe pump, and a nitrogen gas flowrate of 10 sccm was input to the atomizer. The liquid was flash-evaporated at 250° C. and delivered to the SiAlOx surface. The vapor stream condensed onto the film surface and was cured by UV irradiation using a low-pressure mercury arc lamp.

While remaining under vacuum, the COMPOUND 02/Darocur 1173 layer was vapor coated with an acrylate layer of 97.5% Compound 04 and 2.5% Darocur 1173 approximately 1100 nm thick. A linespeed of 12.5 fpm was held while maintaining the backside of the film in contact with a coating drum chilled to 0° C. With the backside in contact with the drum, the COMPOUND 02 surface was coated with the Compound 04/Darocur 1173 mixture using an organic vapor deposition system and method described in U.S. Pat. No. 8,658,248. The monomer was degassed under vacuum to a pressure of 20 mTorr prior to coating. The liquid was pumped into an ultrasonic atomizer at a liquid flowrate of 2.05 ml/min using a syringe pump, and a nitrogen gas flowrate of 10 sccm was input to the atomizer. The liquid was flash-evaporated at 250° C. and delivered to the COMPOUND 02 surface. The vapor stream condensed onto the film surface and was cured by UV irradiation using a low-pressure mercury arc lamp.

A top etch stop layer of SiAlOx 25-nm-thick was deposited onto Compound 04/SiAlOx coated film as described in the "Method of Vapor Coating Etch Stop and Transfer Layers".

Figure 13:
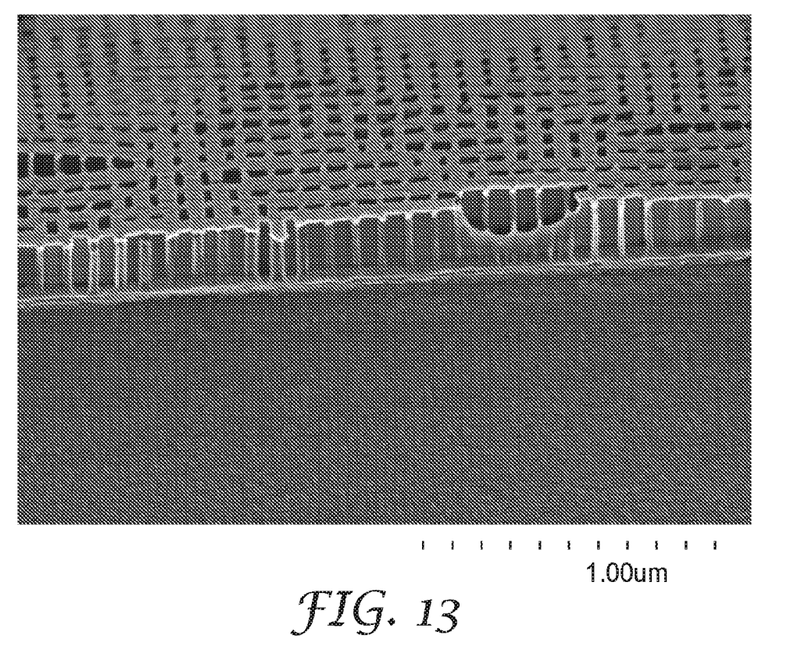
Figure 14:
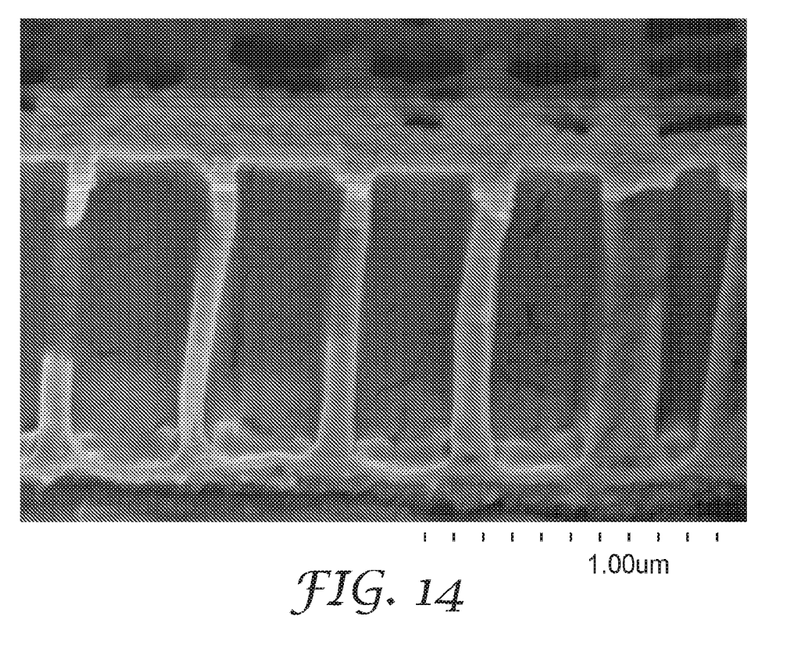

Etching through any land and SiAlOx mask was done in one step: the reactive ion etch was performed with 100 sccm of C6F14 at 0.5 mTorr base pressure, run at 7500 watts at 4 ft/min at a pressure of 6.3 mTorr and a base pressure of 0.5 mTorr. Break-through etch: A second reactive ion etch with 275 sccm of $O_2$ at 0.4 mTorr base pressure at 7500 watts run at 6 ft/min at a pressure of 4.7 mTorr removed the transfer layer in the sections where the mask had been removed. FIG. 13 is a cross-sectional and perspective view image of the array of feature etched in the Compound 04 layer. FIG. 14 is a close-up cross-sectional view image of the vias etched in the Compound 04 layer.

Example 3—Results

The effect of embedding nanofins in replication resin with refractive index data was investigated. First, the effect of the embedding medium on the optical performance of nanofins with vertical sidewalls was studied. As the index contrast between the $TiO_2$ nanofin and the surrounding dielectric environment decreases, the effective refractive indices along the principal axes of the nanofin—which can be thought of as truncated dielectric waveguides—are reduced. Therefore, the ideal nanofin height determined for free-standing nanostructures no longer leads to half-wave plate behavior. The phase difference ($\Delta\varphi$) between light that is linearly polarized along the fast- ($\varphi_{fast}$) and slow-axis ($\varphi_{slow}$) after passing the nanofin is given by:

$$\Delta\varphi = \varphi_{slow} - \varphi_{fast} = (2\pi/\lambda)\Delta n_{eff} H$$

where $\Delta n_{eff}$ is the effective refractive index difference between fast and slow-axes and H is the height of the nanofin. The difference in effective indices are $\Delta n_{eff,air} \approx 0.44$ and $\Delta n_{eff,embedded} \approx 0.2$ for nanofins in air and in embedding resist, respectively. To reinstate half-wave plate behavior for embedded nanofins, a height increase is necessary to counter-balance the loss in effective refractive index contrast. The height of embedded nanofins may preferably be about 1100 nm and about 1500 nm, respectively, for n=1.35 and n=1.5 embedding mediums, respectively.

Good RCP to LCP conversion efficiency can be achieved in different embedding media when appropriate nanofin heights are chosen. However, higher refractive index environments support more guided mode resonances, which result in more sharp dips in the conversion efficiency spectrum. This effect is expected to be suppressed in actual metasurfaces where the nanofins aren't perfectly aligned but rotated with respect to each other.

Next, we studied the influence of tapering angles on the performance of embedded nanofins. Increasing sidewall tapering angles can lead to the nanofin's height being cut off when restricting the maximum base dimensions. The tapering angle may be restricted to 3 and 2 degrees in order to preserve the preferred heights of 1100 nm and 1500 nm, respectively. Similarly to what we have observed for tapered nanofins in air, we see that the high RCP to LCP conversion efficiencies can only be achieved for smaller bandwidths for increasing tapering angles. For embedded structures, a side wall tapering angle of 2 degrees retains a greater than 50% conversion efficiency over the visible spectral range.

To assess the performance of the optimized nanofins in a functional optical metasurface, we studied their behavior when used to construct Pancharatnam-Berry phase gradient metasurfaces. Specifically, six elements are placed across a superperiod of Λ with each nanofin rotated counter-clockwise by 30° with respect to its neighbor on the left. Such a metasurface acts as a blazed grating with the deviation angle given by:

$$\theta = \arcsin(\lambda/\Lambda),$$

at the design wavelength of $\lambda=532$ nm and with a superperiod of $\Lambda=1950$ nm, this yields a deviation angle of 15.8° from the normal incidence.

Electromagnetic full-field simulations of gradient metasurfaces composed of nanofins with base dimensions of 120 nm×300 nm were carried out. The nanofins were surrounded by air and had either vertical side walls or tapering angles of 4° and 8°. The resulting diffraction efficiencies are 97%, 90%, and 63% for vertical, 4°, and 8° tapering, respectively. The degradation in efficiency with increasing side wall tapering angle is consistent with previous findings for individual nanofins.

Informed by the results obtained from the previous studies, optical metasurfaces were designed for survey wafers exploring the direct nanoreplication (termed H1) and nanoimprint lithography (H2) routes.

Survey wafer H1 hosts designs H1A and H1B (Table 1), which both consist of 600 nm tall nanofins embedded in n=1.52 resin with side walls tapered at a 4° angle. Individual nanofins operate approximately as quarter-wave plates due to the height restriction imposed by the fabrication method. This leads to a reduced circular polarization conversion efficiency compared to the ideal case of half-wave plate nanofins. For H1A, a gradient metasurface with a deviation angle of 4.7° was designed. H1B consists of perfectly aligned nanofins to study fabrication variations.

TABLE 1

Design parameters used for survey wafer H1 consisting of metasurfaces H1A and H1B.

| | H1 A | H1 B |
|---|---|---|
| Pattern Type | blazed grating | aligned nanofins |
| Sidewall angle | 4° | 4° |
| Embedding resin index | 1.52 | 1.52 |

TABLE 1-continued

Design parameters used for survey wafer H1
consisting of metasurfaces H1A and H1B.

|  | H1 A | H1 B |
|---|---|---|
| Feature height | 600 nm | 600 |
| Aspect ratio | 4.3 | 4.3 |
| Nanofin dimensions bottom | 140 nm × 270 nm | 140 nm × 270 nm |
| Nanofin dimensions top | 56 nm × 196 nm | 56 nm × 196 nm |

Survey wafer H2 hosts designs H2A, H2B and H2C (Table 2). All designs use straight-walled nanofins of 1100 nm height embedded in a resin with refractive index n=1.36. H2A consists of nanofins with 120 nm×300 nm base dimensions, which act as half-wave plates. A blazed grating with a deviation angle of 4.8° was designed.

H2B and H2C consist of switchable holograms (cat/dog and 3M/Harvard logos, respectively) with different images appearing for orthogonal states of linearly polarized light. Contrary to the periodic patterns used for H1A and H2A, H2B and H2C contain non-repeating patterns of nanofins with varying base dimensions in order to generate a wide range of local phases through the propagating phase approach. The images are encoded as computer generated holograms through a Gerchberg-Saxton algorithm.

TABLE 2

Design parameters used for survey wafer H2 consisting
of metasurfaces H2A, H2B and H2C.

| Pattern Type | H2 A<br>blazed grating | H2 B<br>cat/dog | H2 C<br>3M/Harvard logo |
|---|---|---|---|
| Sidewall angle | 0° | 0° | 0° |
| Embedding resin index | 1.36 | 1.36 | 1.36 |
| Feature height | 1100 nm | 1100 nm | 1100 nm |
| Aspect ratio | 12.2 | 12.2 | 12.2 |
| Dimensions | 120 nm × 300 nm | each element different | each element different |

Table 3A and 3B show the relative performance of nanofins with base dimensions close to the optimum half-wave plate nanofin in the embedding medium of index 1.36. We compromised for nanofins with 140 nm×280 nm base dimensions, which we placed in a 420 nm lattice, in order to meet fabrication restrictions that call for minimum feature sizes of 80 nm. The numbers in Table 3A and 3B indicate relative RCP to LCP conversion efficiency percentages at 532 nm, with 140 nm×280 nm set as 100%. The region in the red box contains better performing parameters. However, they are not accessible due to the 80 nm feature size restriction. Errors of ±20 nm in W (short axis), ±10 nm in H (long axis), and ±20 nm in height perform less than 15% worse than the designed structure.

TABLE 3A

| Base<br>Dimensions | H = 600 nm, 4 degree taper<br>L(nm) | | | |
|---|---|---|---|---|
| W(nm) | 250 | 260 | 270 | 280 |
| 110 | 48.16 | 54.70 | 62.53 | 69.53 |
| 120 | 58.62 | 67.17 | 76.34 | 85.48 |
| 130 | 63.60 | 73.59 | 84.15 | 93.65 |
| 140 | 65.99 | 76.88 | 88.74 | 100.00 |
| 150 | 62.54 | 73.66 | 85.73 | 96.87 |
| 160 | 57.12 | 67.95 | 79.19 | 89.33 |
| 170 | 47.50 | 57.07 | 66.74 | 74.91 |

TABLE 3B

| Height (nm) | 570 | 580 | 590 | 600 | 610 | 620 | 630 |
|---|---|---|---|---|---|---|---|
| W = 140<br>L = 280 | | 83.71 | 88.59 | 94.73 | 100.00 | 106.02 | 110.44 | 115.24 |

Table 3A and 3B Sensitivity analysis TiO$_2$ nanofins embedded in optical resin with refractive index of 1.5. The numbers indicate relative RCP to LCP conversion efficiency percentages with the 140 nm×280 nm×600 nm nanofin set as 100%. Errors of ±20 nm in W (short axis), ±10 nm in L (long axis), and ±20 nm in H (height) perform less than 15% worse than the designed structure.

The invention claimed is:

1. An optical metasurface film, comprising:
   a flexible polymeric film having a first major surface;
   a patterned polymer layer having a first surface proximate to the first major surface of the flexible polymeric film and having a second nanostructured surface opposite the first surface; and
   a refractive index contrast layer comprising a refractive index contrast material adjacent to the nanostructured surface of the patterned polymer layer forming a nanostructured bilayer with a nanostructured interface, the nanostructured bilayer comprising a plurality of nanostructures disposed on the flexible polymeric film, wherein the nanostructured bilayer acts locally on an amplitude, phase, or polarization of light, or a combination thereof and imparts a light phase shift that varies as a function of position of the nanostructured bilayer on the flexible polymeric film, and the light phase shift of the nanostructured bilayer defines a predetermined operative phase profile of the optical metasurface film.

2. The optical metasurface film according to claim 1, wherein the nanostructured bilayer acts locally on the amplitude of light.

3. The optical metasurface film according to claim 1, wherein the nanostructured bilayer acts locally on the phase of light.

4. The optical metasurface film according to claim 1, wherein the nanostructured bilayer acts locally on the polarization of light.

5. The optical metasurface film according to claim 1, wherein the nanostructured bilayer is defined by solid materials.

6. The optical metasurface film according to claim 1, further comprising an etch stop layer separating the patterned polymer layer from the first major surface of the flexible polymeric film.

7. The optical metasurface film according to claim 1, wherein the refractive index contrast material has a first refractive index value and the patterned polymer layer has a second refractive index value being at least 0.25 different than, or 0.5 different than, or 0.75 different than, or 1.0 different than, or 1.4 different than the first refractive index value.

8. The optical metasurface film according to claim 1, wherein the nanostructured bilayer is defined by a plurality of nanostructures embedded into the refractive index contrast layer.

9. The optical metasurface film according to claim 1, wherein the refractive index contrast material comprises a metal oxide or metal nitride.

10. The optical metasurface film according to claim 1, wherein the refractive index contrast material comprises at least one of titanium, zirconium, tantalum, hafnium, niobium, zinc, or cerium; an oxide of titanium, zirconium, tantalum, hafnium, niobium, zinc, or cerium; a nitride of titanium, zirconium, tantalum, hafnium, niobium, zinc, or cerium; a sulfide of titanium, zirconium, tantalum, hafnium, niobium, zinc, or cerium; or a combination thereof.

11. The optical metasurface film according to claim 1, wherein the patterned polymer layer comprises a fluoropolymer, (meth)acrylate (co)polymer, or silica containing polymers.

12. The optical metasurface film according to claim 1, wherein the patterned polymer layer comprises fluoroacrylate and the refractive index contrast material comprises titanium dioxide.

13. The optical metasurface film according to claim 1, wherein the patterned polymer layer comprises (meth)acrylate and the refractive index contrast material comprises titanium dioxide.

14. The optical metasurface film according to claim 1, wherein nanostructures forming the nanostructured surface has an aspect ratio of at least about 1:1, 2:1, 5:1, 10:1 or 15:1.

15. The optical metasurface film according to claim 1, wherein nanostructures forming the nanostructured surface defines a tapered sidewall having an angle in a range from about 1 to 10 degrees, 2 to 10 degrees, 3 to 10 degrees, 4 to 10 degrees, 1 to 6 degrees, 2 to 6 degrees, or 3 to 6 degrees.

16. The optical metasurface film according to claim 1, wherein nanostructures forming the nanostructured surface defines a tapered sidewall having an angle in a range from about 0 to 10 degrees, 0 to 6 degrees, 0 to 3 degrees, 0 to 2 degrees, 0 to 1 degree, or 0 degrees.

17. The optical metasurface film according to claim 1, wherein the flexible polymeric film has an average thickness in a range from about 5 micrometers to about 300 micrometers.

18. The optical metasurface film according to claim 1, wherein nanostructures forming the nanostructured surface has a height of 5 micrometer or less, or in a range from about 100 nanometers to about 3000 nanometers, or from about 500 nanometers to about 1500 nanometers.

19. The optical metasurface film according to claim 1, wherein nanostructures forming the nanostructured surface has a varying orientation that depends on the location of the individual nanostructure on the flexible polymeric film.

20. The optical metasurface film according to claim 1, wherein nanostructures forming the nanostructured surface has a varying spatial arrangement that depends on the location of the individual nanostructure on the flexible polymeric film.

* * * * *